(12) United States Patent
Cui et al.

(10) Patent No.: US 11,930,246 B2
(45) Date of Patent: Mar. 12, 2024

(54) SEAMLESS SWITCHING METHOD, DEVICE AND STORAGE MEDIUM OF SOFTWARE AND HARDWARE DECODING RESOLUTION

(71) Applicant: SHANGHAI BILIBILI TECHNOLOGY CO., LTD., Shanghai (CN)

(72) Inventors: Honglei Cui, Shanghai (CN); Hanchao Zheng, Shanghai (CN); Hui Chen, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 419 days.

(21) Appl. No.: 17/425,176

(22) PCT Filed: Dec. 16, 2019

(86) PCT No.: PCT/CN2019/125521
§ 371 (c)(1),
(2) Date: Jul. 22, 2021

(87) PCT Pub. No.: WO2020/151397
PCT Pub. Date: Jul. 30, 2020

(65) Prior Publication Data
US 2022/0124403 A1    Apr. 21, 2022

(30) Foreign Application Priority Data
Jan. 23, 2019   (CN) .......................... 201910061657.1

(51) Int. Cl.
*H04N 21/4402*    (2011.01)
*H04N 19/40*    (2014.01)
*H04N 19/44*    (2014.01)
*H04N 19/70*    (2014.01)

(52) U.S. Cl.
CPC ......... *H04N 21/4402* (2013.01); *H04N 19/40* (2014.11); *H04N 19/44* (2014.11); *H04N 19/70* (2014.11)

(58) Field of Classification Search
CPC .... H04N 21/4402; H04N 19/70; H04N 19/44; H04N 19/40
See application file for complete search history.

(56) References Cited

U.S. PATENT DOCUMENTS 8,868,999 B1    10/2014 Varnica et al.
9,251,855 B2    2/2016 Graves et al.
(Continued)

FOREIGN PATENT DOCUMENTS

CN    101778259 A    7/2010
CN    105992056 A    10/2016
(Continued)

OTHER PUBLICATIONS

International Patent Application No. PCT/CN2019/125521; Int'l Search Report; dated Mar. 18, 2020; 2 pages.

*Primary Examiner* — Shawn S An
(74) *Attorney, Agent, or Firm* — BakerHostetler

(57) ABSTRACT

The present invention provides a method, device and computer-readable medium of a seamless switch between resolutions based on software and hardware decoding and belongs to a field of the Internet technology. The method, device and computer-readable medium of the present invention comprise, during playing a DASH video, initializing a software decoder according to a video stream in a target encoded format received by an original decoder when it needs to switch to another resolution, at the same time the original decoder continuing to decode the video stream in an original encoded format existing in a buffer, decoding the video stream in the target encoded format using the software decoder after the video stream in the original encoded (Continued)

format is decoded, at the same time initializing a second hardware decoder corresponding to the target encoded format, switching to the second hardware decoder and stopping software decoding when a decoding progress of the second hardware decoder catches up with a decoding progress of the software decoder, so as to realize the seamless switch between the resolutions, avoid sticking in the process of playing the video, and improve user experience.

20 Claims, 2 Drawing Sheets

(56) References Cited

U.S. PATENT DOCUMENTS

| | | | | |
|---|---|---|---|---|
| 2013/0128989 | A1* | 5/2013 | Kyakuno | H04N 21/4314 |
| | | | | 375/E7.027 |
| 2016/0156959 | A1* | 6/2016 | Lee | H04N 21/4345 |
| | | | | 725/132 |
| 2017/0127074 | A1 | 5/2017 | Wu et al. | |
| 2018/0007362 | A1* | 1/2018 | Krishnan | H04N 19/19 |
| 2019/0327480 | A1* | 10/2019 | Morishige | H04N 19/174 |

FOREIGN PATENT DOCUMENTS

| | | |
|---|---|---|
| CN | 107249144 A | 10/2017 |
| CN | 107396123 A | 11/2017 |
| CN | 107707976 A | 2/2018 |
| CN | 107786890 A | 3/2018 |
| CN | 109168078 A | 1/2019 |
| EP | 2716337 A3 | 8/2014 |
| WO | WO 2017/007659 A1 | 1/2017 |

* cited by examiner

SEAMLESS SWITCHING METHOD, DEVICE AND STORAGE MEDIUM OF SOFTWARE AND HARDWARE DECODING RESOLUTION

CROSS-REFERENCE TO RELATED APPLICATION

The present application is a national phase application of PCT international patent application No. PCT/CN2019/125521, filed on Dec. 16, 2019, which claims priority to Chinese patent application No. 201910061657.1, filed on Jan. 23, 2019. The entire disclosure of the above-identified application is hereby incorporated by reference herein and made a part of this specification.

TECHNICAL FIELD

The present invention relates to a field of the Internet technology, more particularly to a field of network video technology, and specifically refers to a seamless switching method, a device and a computer-readable storage medium of software and hardware decoding resolution.

BACKGROUND

The existing mobile player usually provides two video decoding schemes: software decoding and hardware decoding. Generally, the hardware decoding is preferred by a player client, because the hardware decoding takes up less system resources and computing performance of the player client using the hardware decoding is higher.

DASH (Dynamic Adaptive Streaming over HTTP) video is a common network video format, during playing a DASH video, a switching of a video definition involves a change of video coding, a video decoder needs to adapt to the switching between H.264 and H.265. Since an initialization of the video decoder takes a certain time, it is easy to get stuck when switching the video definition, the video playback is not smooth, and user's viewing experience is poor.

How to provide a seamless switching method of hardware decoding resolution suitable for the DASH video, to avoid sticking during playback, and improve the user experience, has become an urgent problem in the field.

SUMMARY

The purpose of the present invention is to overcome disadvantages of the prior art, and provide a seamless switching method, device and computer-readable storage medium of software and hardware decoding resolution, which when a resolution is switched, firstly, initializes a soft decoder, uses the soft decoder to perform a corresponding second decoder decoding operation, and starts hard decoding using the second hard decoder at the same time, when a decoding progress of the second hard decoder catches up with a decoding progress of the soft decoder, then switches to the hard decoding, so as to realize the seamless switching between resolutions. In order to realize the above purpose, the seamless switching method of software and hardware decoding resolution in this present invention includes the following steps:

(1) after receiving a packaged video, a player performing an unpacking operation on the packaged video to obtain a video stream with a first encoded format;

(2) the player decoding the video stream with the first encoded format using a first hard decoder, and playing a video at a first resolution;

(3) the player receiving a switching resolution ratio instruction;

(4) the player performing the unpacking operation on the packaged video to obtain a video stream with a second encoded format;

(5) the player decoding the video stream with the second encoded format using a soft decoder and playing the video at a second resolution;

(6) the player decoding the video stream with the second encoded format using a second hard decoder;

(7) when a decoding progress of the second hard decoder catches up with a decoding progress of the soft decoder, playing the video at the second resolution decoded by the second hard decoder and stopping the soft decoder.

In the seamless switching method of software and hardware decoding resolution, the packaged video is a DASH format video.

In the seamless switching method of software and hardware decoding resolution, the first encoded format is any one of an H.264 encoded format and an H.265 encoded format, and the second encoded format is the other of the two encoded formats except the first encoded format; the first hard decoder is a hardware decoder corresponding to the first encoded format, and the second hard decoder is a hardware decoder corresponding to the second encoded format.

In the seamless switching method of software and hardware decoding resolution, the first encoded format is the same as the second encoded format.

In the seamless switching method of software and hardware decoding resolution, the step (5) specifically comprises the following steps:

(51) the player sending the video stream with the second encoded format to the soft decoder;

(52) the player initializing the soft decoder according to the second encoded format;

(53) the soft decoder decoding the video stream with the second encoded format and outputting second resolution video frames;

(54) after the video stream with the first encoded format is decoded by the first hard decoder, the player starting rendering the second resolution video frames and playing the video at the second resolution.

In the seamless switching method of software and hardware decoding resolution, the step (7) specifically comprises the following steps:

(71) the player comparing the second resolution video frames obtained from the soft decoder and second resolution video frames obtained from the second hard decoder in real time, and rendering the one with a lager time stamp between the two second resolution video frames;

(72) when the time stamp of the second resolution video frames obtained from the second hard decoder is larger than the time stamp of the second resolution video frames obtained from the soft decoder, rendering the second resolution video frames obtained from the second hard decoder to obtain and play the video at the second resolution;

(73) stopping the soft decoder.

In the seamless switching method of software and hardware decoding resolution, the step (3) specifically comprises:

the player detecting a bandwidth of a network of receiving the packaged video in real time, and generating the switching resolution ratio instruction according to a detection result automatically.

In the seamless switching method of software and hardware decoding resolution, the step (3) specifically comprises:

the player generating a corresponding switching resolution ratio instruction according to a received user operation.

In the seamless switching method of software and hardware decoding resolution, the step (2) specifically comprises the following steps:

(21) the player decoding the video stream with the first encoded format using the soft decoder, and playing the video at a first resolution;

(22) the player decoding the video stream with the first encoded format using the first hard decoder;

(23) when a decoding progress of the first hard decoder catches up with a decoding progress of the soft decoder, playing the video at the first resolution decoded by the first hard decoder and stopping the soft decoder.

In the seamless switching method of software and hardware decoding resolution, the player is an iOS video player, the decoder is a VideoToolbox hardware decoder.

In the seamless switching method of software and hardware decoding resolution, the player is an Android video player, the decoder is a MediaCodec hardware decoder.

This present invention further provides a computer-readable storage medium, storing computer programs, when the computer programs are executed by a processor, the seamless switching method of software and hardware decoding resolution is realized.

This present invention further provides a seamless switching device of software and hardware decoding resolution, which comprises a processor and a memory, wherein the memory stores computer programs, when the computer programs are executed by the processor, the seamless switching method of software and hardware decoding resolution is realized.

The method, device and computer-readable medium of the present invention comprise, during playing a DASH video, initializing a software decoder according to a video stream in a target encoded format received by an original decoder when it needs to switch to another resolution, at the same time the original decoder continuing to decode the video stream in an original encoded format existing in a buffer, decoding the video stream in the target encoded format using the software decoder after the video stream in the original encoded format is decoded, at the same time initializing a second hardware decoder corresponding to the target encoded format, switching to the second hardware decoder and stopping software decoding when a decoding progress of the second hardware decoder catches up with a decoding progress of the software decoder, so as to realize the seamless switch between the resolutions, avoid sticking in the process of playing the video, and improve user experience. And the seamless switching method, device and computer-readable storage medium of software and hardware decoding resolution of the present invention have the advantages of simple implementation, low application cost and wide application range.

DETAILED DESCRIPTION OF ILLUSTRATIVE EMBODIMENTS

In order to understand the technical content of the present invention more clearly, the following embodiments are particularly described.

Figure 1:
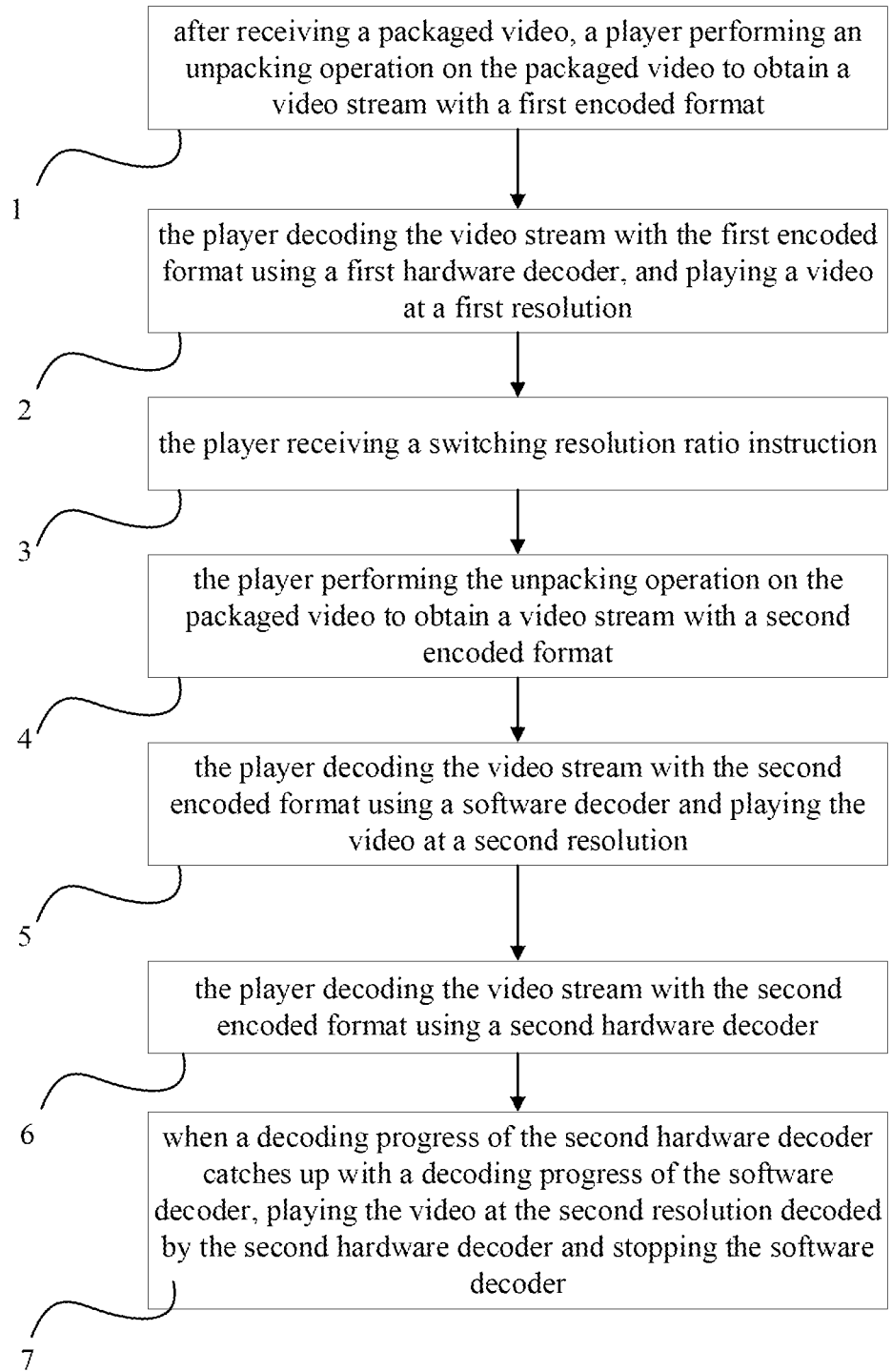
FIG. 1 illustrates a flowchart of steps of a seamless switching method of software and hardware decoding resolution of the present invention.

Please refer to FIG. 1, it is a flowchart of steps of a seamless switching method of software and hardware decoding resolution of the present invention.

In one embodiment, the seamless switching method of software and hardware decoding resolution includes the following steps:

(1) after receiving a packaged video, a player performing an unpacking operation on the packaged video to obtain a video stream with a first encoded format;

(2) the player decoding the video stream with the first encoded format using a first hard decoder, and playing a video at a first resolution;

(3) the player receiving a switching resolution ratio instruction;

(4) the player performing the unpacking operation on the packaged video to obtain a video stream with a second encoded format;

(5) the player decoding the video stream with the second encoded format using a soft decoder and playing the video at a second resolution; after video frames are decoded by the soft decoder, it needs to wait for the first hard decoding to finish decoding and rendering a cache, and then output the video frames to keep pictures continuous;

(6) the player decoding the video stream with the second encoded format using a second hard decoder;

(7) when a decoding progress of the second hard decoder catches up with a decoding progress of the soft decoder, playing the video at the second resolution decoded by the second hard decoder and stopping the soft decoder.

Wherein, the packaged video can be a DASH format video. The first encoded format is an H.264 encoded format, and the second encoded format is an H.265 encoded format, and it is feasible for adverseness. The first hard decoder is a decoder corresponding to the first encoded format, the second hard decoder is a decoder corresponding to the second encoded format. In addition, the first encoded format is the same as the second encoded format, i.e. both of the first encoded format and the second encoded format are H.264 encoded formats, or both of the first encoded format and the second encoded format are h.265 encoded formats, but they have different resolutions, for example, both of the first encoded format and the second encoded format are H.264 encoded formats, with resolutions of 480p and 720p respectively.

In a preferred embodiment, the step (5) specifically comprises the following steps:

(51) the player sending the video stream with the second encoded format to the soft decoder;

(52) the player initializing the soft decoder according to the second encoded format;

(53) the soft decoder decoding the video stream with the second encoded format and outputting second resolution video frames;

(54) after the video stream with the first encoded format is decoded by the first hard decoder, the player starting rendering the second resolution video frames and playing the video at the second resolution.

In a further preferred embodiment, the step (7) specifically comprises the following steps:
(71) the player comparing the second resolution video frames obtained from the soft decoder and second resolution video frames obtained from the second hard decoder in real time, and rendering the one with a lager time stamp between the two second resolution video frames;
(72) when the time stamp of the second resolution video frames obtained from the second hard decoder is larger than the time stamp of the second resolution video frames obtained from the soft decoder, rendering the second resolution video frames obtained from the second hard decoder to obtain and play the video at the second resolution;
(73) stopping the soft decoder.

In another preferred embodiment, the step (3) can specifically comprise:
the player detecting a bandwidth of a network of receiving the packaged video in real time, and generating the switching resolution ratio instruction according to a detection result automatically. So as to realize an automatic switching according to the bandwidth.

Or the step (3) can specifically comprise:
the player generating a corresponding switching resolution ratio instruction according to a received user operation, that is called manual switching.

In a further preferred embodiment, the step (2) specifically comprises the following steps:
(21) the player decoding the video stream with the first encoded format using the soft decoder, and playing the video at a first resolution;
(22) the player decoding the video stream with the first encoded format using the first hard decoder;
(23) when a decoding progress of the first hard decoder catches up with a decoding progress of the soft decoder, playing the video at the first resolution decoded by the first hard decoder and stopping the soft decoder.

In the embodiment, a first frame can be achieved quickly, waiting time of the user can be saved, and the use experience can be improved.

In a further preferred embodiment, the player can also be an Android video player, correspondingly, the decoder is a MediaCodec hardware decoder.

The present invention also provides a seamless switching device and computer-readable storage medium of software and hardware decoding resolution, the device includes a processor and a memory. The memory is the computer-readable storage medium, storing computer programs. When the computer programs are executed by the processor, the seamless switching method of software and hardware decoding resolution is realized.

Figure 2:
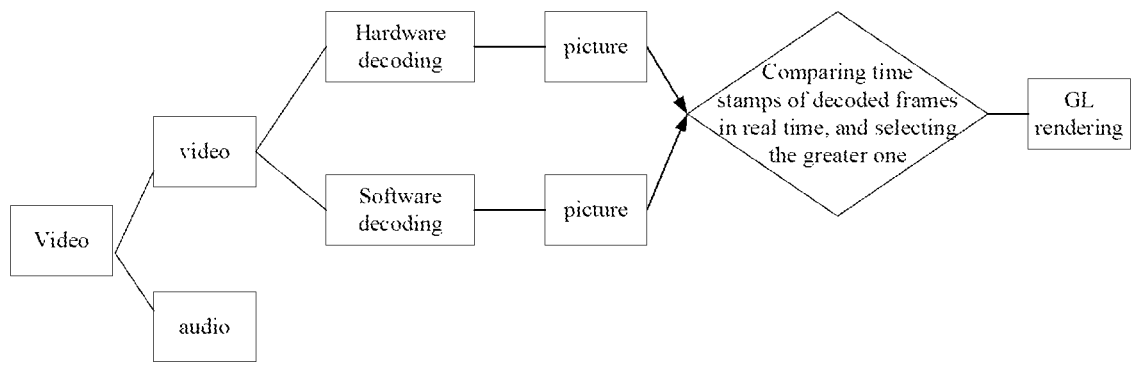
FIG. 2 illustrates a flow diagram of the seamless switching method of software and hardware decoding resolution in the practical application of the present invention.

In the practical application, the flow of the seamless switching method of software and hardware decoding resolution of the present invention is shown in FIG. 2, specific implementation manner of the method is illustrated by the following examples.

Embodiment 1

A user uses a mobile terminal, such as a mobile phone, to play a DASH video, and the mobile terminal is set to hardware decoding. A playback resolution set at this time is 480P. The DASH video begins to unpack to get a corresponding video stream of the H.264 encoded format. A H.264 hard decoder is initialized, and a video stream of the H.264 encoded format is decoded into frames, then, the video can be played at a resolution of 480P. When the user switches the resolution from 480P to 720P manually, a flow diagram of switching is shown in FIG. 2. The video encoded output after the DASH video is unpacked becomes the H.265 format. First frame after encoded changed needs to carry extradata initialized by codec to initialize data of the decoder. After the decoder detects the encoded change, creating a soft decoder, and copying video streams (video streams at 720P) after unpacked to the soft decoder. The first frame of the extradata initialized by codec after resolution change is used for soft decoding initialization. After the soft decoder gets the video streams, starts to decode without render. After the video streams at 480P in the cache are decoded by the first hard decoder, the soft decoder starts to render. The first hard decoder is stopped, and then re-creating and initializing the second hard decoder, and starting to decode the video stream at 720P. When the second hard decoder and the soft decoder put decoded video frames into a video rendering queue, comparing time stamps of the video frames and selecting the larger one. When the time stamp of the hard decoded video frames is larger than that of the soft decoded video frames, the soft decoding is stopped and the hard decoding starts to output the video frames normally, thus the seamless switching of resolution is completed.

In the DASH video, the resolution of 1080P and 720P are encoded in H.265, and the resolution of 480p and 360p are encoded in H.264. Therefore, resolution switching from 360p to 1080p is the same as the above process. When the resolution is switched from 720p to 480p, the conversion from H.265 decoder to H.264 decoder is similar to the above process.

The mobile terminal can be an Android device, then the player is an Android video player, correspondingly, the decoder is a MediaCodec hardware decoder.

When the embodiment is used for picture quality switching (definition switching, for example, 480p to 720p), during the switching process, the decoder needs to be restarted, at this time, soft decoding is started to make up for the situation that the hard decoding restart process cannot output frames, so that video pictures look smoother.

Embodiment 2

Difference between the embodiment 2 and the embodiment 1 is that the mobile terminal such as the mobile phone used by the user can detect a bandwidth of a network. During the DASH video playback, after a change of the bandwidth is detected, whether the resolution needs to be adjusted can be determined automatically. When the resolution needs to be adjusted, the switching is completed automatically according to a current resolution and a target resolution with the switching process which is described in the embodiment 1. The automatic switching mode can adapt to the bandwidth to the greatest extent, avoid the sticking, and ensure the viewing experience of users.

Embodiment 3

At the beginning of the DASH video playback, a method of soft decoding first and then converting to hard decoding can also be adopted. Specifically, when the player is set to adopt 480P resolution, the video stream with the H.264 encoded format is decoded by a soft decoder first, and the video is played at 480p resolution; then the player decodes the video stream with the H.264 encoded format using the first hard decoder; when a decoding progress of the first hard decoder catches up with a decoding progress of the soft decoder, the video at 480P resolution decoded by the first hard decoder is played, and the soft decoder is stopped. In this way, soft decoding and hard decoding can be created at the same time during the start-up playing process, output speed of frames of the soft decoding is faster, so as to make up for the slow first frame of the hard decoding, after the hard decoding catches up with the soft decoding, switching to the hard decoding, the hard decoding saves power, consumes less CPU and is more fluent.

In the seamless switching method, device and computer-readable storage medium of software and hardware decoding resolution, during playing a DASH video, when it is necessary to switch a resolution, initializing a soft decoder according to a video stream of a target encoded format received by an original decoder, at the same time, the original decoder continuing to decode the video stream of an original encoded format existing in the cache in an original format, after the video stream of the original encoded format is decoded, decoding the video stream of the target encoded format using the soft decoder, and initializing a second hard decoder corresponding to the target encoded format at the same time and decoding, when a decoding progress of the second hard decoder catches up with a decoding progress of the soft decoder, switching to the second hard decoder and stopping soft decoding, so as to realize the seamless switching between resolutions, avoid sticking in the process of playing, and improve the user experience. And the seamless switching method, device and computer-readable storage medium of software and hardware decoding resolution of the present invention have the advantages of simple implementation, low application cost and wide application range.

In this specification, the present invention has been described with reference to its specific embodiments. However, it is clear that various modifications and changes can still be made without departing from the spirit and scope of the present invention. Therefore, the specification and drawings shall be considered as illustrative rather than restrictive.

What is claimed is:

1. A method of a seamless switch between resolutions based on software and hardware decoding, comprising:
    in response to receiving packaged video data associated with a video, performing an unpacking operation on the packaged video data to obtain a video stream in a first encoded format by a player;
    decoding the video stream in the first encoded format using a first hardware decoder, and playing the video at a first resolution by the player;
    receiving an instruction of switching to a second resolution of the video;
    performing the unpacking operation on the packaged video data to obtain a video stream in a second encoded format by the player;
    decoding the video stream in the second encoded format using a software decoder and starting to play the video at the second resolution, wherein playing the video at the second resolution starts seamlessly following a completion of playing the video at the first resolution based on the video stream in the first encoded format stored in a buffer and decoded by the first hardware decoder;
    decoding the video stream in the second encoded format using a second hardware decoder; and
    in response to determining that a decoding progress of the second hardware decoder catches up with a decoding progress of the software decoder, playing the video at the second resolution based on the video stream in the second encoded format decoded by the second hardware decoder and ending the software decoder.

2. The method of claim 1, wherein the packaged video data are in a DASH (Dynamic Adaptive Streaming over HTTP) format.

3. The method of claim 1,
    wherein the first encoded format is one of an H.264 (MPEG-4 Advanced Video Coding) encoded format and an H.265 (High Efficiency Video Coding) encoded format, the second encoded format is another of the two encoded formats, and the second encoded format is different from the first encoded format; and
    wherein the first hardware decoder is a hardware decoder corresponding to the first encoded format, and the second hardware decoder is a hardware decoder corresponding to the second encoded format.

4. The method of claim 1, wherein the first encoded format is the same as the second encoded format.

5. The method of claim 1, wherein the decoding the video stream in the second encoded format using a software decoder and starting to play the video at the second resolution further comprises:
    sending the video stream in the second encoded format to the software decoder by the player;
    initializing the software decoder according to the second encoded format by the player;
    decoding the video stream in the second encoded format using the software decoder and outputting frames of the video at the second resolution; and
    starting to render the frames of the video at the second resolution after the first hardware decoder completes the decoding the video stream in the first encoded format stored in the buffer.

6. The method of claim 1, wherein the in response to determining that a decoding progress of the second hardware decoder catches up with a decoding progress of the software decoder, playing the video at the second resolution based on the video stream in the second encoded format decoded by the second hardware decoder and ending the software decoder further comprises:
    comparing a time stamp of a video frame at the second resolution obtained from the software decoder and a time stamp of a same video frame at the second resolution obtained from the second hardware decoder in real time;
    in response to determining that the time stamp of the video frame at the second resolution obtained from the second hardware decoder is greater than the time stamp of the same video frame at the second resolution obtained from the software decoder, rendering and playing the video frame obtained from the second hardware decoder; and
    ending the software decoder for decoding the video stream in the second encoded format.

7. The method of claim 1, further comprising:
    automatically generating, by the player, the instruction of switching to the second resolution of the video based on detecting a bandwidth associated with receiving the video data in real time.

8. The method of claim 1, further comprising:
    generating, by the player, the instruction of switching to the second resolution of the video based on user input received by the player.

9. The method of claim 1, wherein the decoding the video stream in the first encoded format using a first hardware decoder, and playing the video at a first resolution by the player further comprises:
  decoding the video stream in the first encoded format using the software decoder, and playing the video at a first resolution by the player;
  decoding the video stream in the first encoded format using the first hardware decoder; and
  in determining that a decoding progress of the first hardware decoder catches up with a decoding progress of the software decoder, playing the video at the first resolution based on the video stream in the first encoded format decoded by the first hardware decoder and ending the software decoder for decoding the video stream in the first encoded format.

10. A non-transitory computer-readable storage medium, storing computer programs, when the computer programs are executed by a processor, the computer programs cause the processor to perform operations comprising:
  in response to receiving packaged video data associated with a video, performing an unpacking operation on the packaged video data to obtain a video stream in a first encoded format by a player;
  decoding the video stream in the first encoded format using a first hardware decoder, and playing the video at a first resolution by the player;
  receiving an instruction of switching to a second resolution of the video;
  performing the unpacking operation on the packaged video data to obtain a video stream in a second encoded format by the player;
  decoding the video stream in the second encoded format using a software decoder and starting to play the video at the second resolution, wherein playing the video at the second resolution starts seamlessly following a completion of playing the video at the first resolution based on the video stream in the first encoded format stored in a buffer and decoded by the first hardware decoder;
  decoding the video stream in the second encoded format using a second hardware decoder; and
  in response to determining that a decoding progress of the second hardware decoder catches up with a decoding progress of the software decoder, playing the video at the second resolution based on the video stream in the second encoded format decoded by the second hardware decoder and ending the software decoder.

11. The non-transitory computer-readable storage medium of claim 10, wherein the packaged video data are in a DASH (Dynamic Adaptive Streaming over HTTP) format.

12. The non-transitory computer-readable storage medium of claim 10, wherein the decoding the video stream in the second encoded format using a software decoder and starting to play the video at the second resolution further comprising:
  sending the video stream in the second encoded format to the software decoder by the player;
  initializing the software decoder according to the second encoded format by the player;
  decoding the video stream in the second encoded format using the software decoder and outputting frames of the video at the second resolution; and
  starting to render the frames of the video at the second resolution after the first hardware decoder completes the decoding the video stream in the first encoded format stored in the buffer.

13. The non-transitory computer-readable storage medium of claim 10, wherein the in response to determining that a decoding progress of the second hardware decoder catches up with a decoding progress of the software decoder, playing the video at the second resolution based on the video stream in the second encoded format decoded by the second hardware decoder and ending the software decoder further comprises:
  comparing a time stamp of a video frame at the second resolution obtained from the software decoder and a time stamp of a same video frame at the second resolution obtained from the second hardware decoder in real time;
  in response to determining that the time stamp of the video frame at the second resolution obtained from the second hardware decoder is greater than the time stamp of the same video frame at the second resolution obtained from the software decoder, rendering and playing the video frame obtained from the second hardware decoder; and
  ending the software decoder for decoding the video stream in the second encoded format.

14. The non-transitory computer-readable storage medium of claim 10, wherein the decoding the video stream in the first encoded format using a first hardware decoder, and playing the video at a first resolution by the player further comprises:
  decoding the video stream in the first encoded format using the software decoder, and playing the video at a first resolution by the player;
  decoding the video stream in the first encoded format using the first hardware decoder; and
  in determining that a decoding progress of the first hardware decoder catches up with a decoding progress of the software decoder, playing the video at the first resolution based on the video stream in the first encoded format decoded by the first hardware decoder and ending the software decoder for decoding the video stream in the first encoded format.

15. A device of a seamless switch between resolutions based on software and hardware decoding, which comprises a processor and a memory, wherein the memory stores computer programs, when the computer programs are executed by the processor, the computer programs cause the processor to perform operations comprising:
  in response to receiving packaged video data associated with a video, performing an unpacking operation on the packaged video data to obtain a video stream in a first encoded format by a player;
  decoding the video stream in the first encoded format using a first hardware decoder, and playing the video at a first resolution by the player;
  receiving an instruction of switching to a second resolution of the video;
  performing the unpacking operation on the packaged video data to obtain a video stream in a second encoded format by the player;
  decoding the video stream in the second encoded format using a software decoder and starting to play the video at the second resolution, wherein playing the video at the second resolution starts seamlessly following a completion of playing the video at the first resolution based on the video stream in the first encoded format stored in a buffer and decoded by the first hardware decoder;
  decoding the video stream in the second encoded format using a second hardware decoder; and in response to determining that a decoding progress of the second hardware decoder catches up with a decoding progress of the software decoder, playing the video at the second resolution based on the video stream in the second encoded format decoded by the second hardware decoder and ending the software decoder.

16. The device of claim 15, wherein the packaged video data are in a DASH (Dynamic Adaptive Streaming over HTTP) format.

17. The device of claim 15, wherein the decoding the video stream in the second encoded format using a software decoder and starting to play the video at the second resolution further comprising:
sending the video stream in the second encoded format to the software decoder by the player;
initializing the software decoder according to the second encoded format by the player;
decoding the video stream in the second encoded format using the software decoder and outputting frames of the video at the second resolution; and
starting to render the frames of the video at the second resolution after the first hardware decoder completes the decoding the video stream in the first encoded format stored in the buffer.

18. The device of claim 15, wherein the in response to determining that a decoding progress of the second hardware decoder catches up with a decoding progress of the software decoder, playing the video at the second resolution based on the video stream in the second encoded format decoded by the second hardware decoder and ending the software decoder further comprises:
comparing a time stamp of a video frame at the second resolution obtained from the software decoder and a time stamp of a same video frame at the second resolution obtained from the second hardware decoder in real time;
in response to determining that the time stamp of the video frame at the second resolution obtained from the second hardware decoder is greater than the time stamp of the same video frame at the second resolution obtained from the software decoder, rendering and playing the video frame obtained from the second hardware decoder; and
ending the software decoder for decoding the video stream in the second encoded format.

19. The device of claim 15, the operations further comprising:
automatically generating, by the player, the instruction of switching to the second resolution of the video based on detecting a bandwidth associated with receiving the video data in real time.

20. The device of claim 15, wherein the decoding the video stream in the first encoded format using a first hardware decoder, and playing the video at a first resolution by the player further comprises:
decoding the video stream in the first encoded format using the software decoder, and playing the video at a first resolution by the player;
decoding the video stream in the first encoded format using the first hardware decoder; and
in determining that a decoding progress of the first hardware decoder catches up with a decoding progress of the software decoder, playing the video at the first resolution based on the video stream in the first encoded format decoded by the first hardware decoder and ending the software decoder for decoding the video stream in the first encoded format.

* * * * *